Patented Nov. 12, 1940

2,221,663

UNITED STATES PATENT OFFICE 2,221,663

POLYMERIC DIMETHALLYL MALEATE

Henry S. Rothrock, Wilmington, Del., assignor to E. I. du Pont de Nemours & Company, Wilmington, Del., a corporation of Delaware No Drawing. Application August 5, 1937,
Serial No. 157,630

1 Claim. (Cl. 260—78)

This invention relates to esters, more particularly to esters of unsaturated polycarboxylic acids with monohydric unsaturated alcohols of the allyl type, i. e., having the carbinol residue attached to an unsaturated carbon and specifically to a process for preparing these esters.

This invention has as an object a feasible process for the preparation of unsaturated polycarboxylic acid esters of alcohols of the allyl type. A further object is the preparation of new esters. A still further object is the preparation of solvents and plasticizers of novel and useful types. Other objects will appear hereinafter.

These objects are accomplished by the following invention wherein an allyl type alcohol (an alcohol having its carbinol group attached by means of a single bond to a carbon multiple bonded to another carbon) is reacted with an ester of an unsaturated polycarboxylic acid with an alcohol more volatile than the allyl type alcohol.

In attempts to prepare allyl type alcohol esters of unsaturated polybasic carboxylic acids, I have found that the usual methods of esterification are not suitable. For example, in an effort to prepare esters by direct esterification from allyl type alcohols, e. g., methallyl alcohol and unsaturated polybasic acids such as maleic acid, it is found that reaction takes place very slowly, if at all, in the absence of a catalyst. The addition of stronger acids such as sulfuric acid or phosphoric acid to catalyze the reaction serves to bring about extensive rearrangement and decomposition of the allyl type alcohol. Thus under acidic conditions methallyl alcohol is converted rapidly to products containing a large proportion of isobutyraldehyde. Accordingly, it has not been possible to prepare satisfactorily esters of this type by orthodox methods. I have found, however, that it is possible to prepare allyl type alcohol esters of unsaturated polycarboxylic acids by ester interchange under alkaline conditions at relatively low temperatures. According to my process, the allyl type alcohol is condensed with a lower ester of the unsaturated polycarboxylic acid (such as the methyl or ethyl ester) in the presence of an alkaline catalyst. The allyl type alcohol displaces the methyl or ethyl alcohol from the polycarboxylic acid ester and the methyl or ethyl alcohol is then distilled from the reaction mixture as formed. The reaction is very suitably carried out in solution in inert solvents such as benzene or toluene, which will serve to assist in the removal of the alcohol of reaction by distillation as a binary mixture. The reaction usually requires from 6 to 10 hours for completion, depending upon the quantity of catalyst and the reactivity of the particular compound used. The reaction time can be shortened by employing higher temperatures of reaction, for example by using less solvent or a higher boiling solvent. Larger amounts of catalysts aid in shortening the reaction time. The distillation can ordinarily be carried out at such a rate as to distill the alcohol of reaction (methanol or ethanol) at about the rate at which it is given off in the interchange reaction. The quantity of this alcohol eliminated can be determined readily by washing it from the benzene distillate with water and measuring the change in volume. The reaction products can be worked up in any desired manner. The reaction products are generally washed with water and then distilled, but the invention is not limited to this means of purification.

Ester interchange between the lower ester of the unsaturated polycarboxylic acid is in large part the reaction exemplified by the following formula:

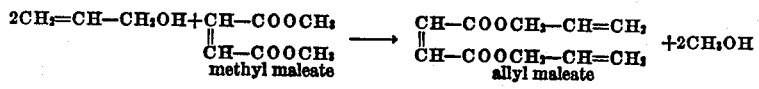

However, under the alkaline reaction conditions employed, a secondary reaction appears to take place. While the exact nature of this reaction has not been definitely determined, analytical data indicate the product to be formed by the addition of a molecule of allyl type alcohol to the unsaturated polycarboxylic ester:

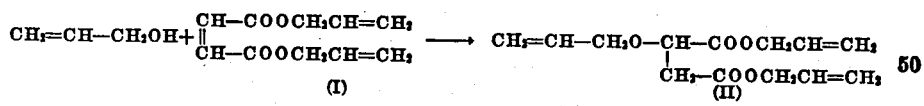

This reaction is probably limited to alpha-beta-unsaturated polycarboxylic acids such as maleic or dihydronaphthalenedicarboxylic acids and does not apply to the other unsaturated acids of this invention, such as vinylmalonic acid,

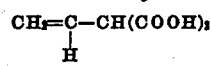

The extent of this secondary reaction depends upon the reaction conditions employed. By avoiding an excess of alcohol and using as short reaction time as possible, this side reaction may be held to a minimum, although it is probably impossible to avoid it completely. However, I do not consider the formation of compounds of type II as undesirable and, as a matter of fact, consider it as a part of my invention particularly since it represents a highly unsaturated molecule and further is still an allyl type alcohol ester of an unsaturated polycarboxylic acid. There is a possibility also that the lower alcohol liberated in the interchange reaction may add to the unsaturated double bond of the ester, but since I prefer to use conditions which remove this lower alcohol from the reaction mixture as it is set free, this side reaction is negligible.

I have also made the very interesting discovery that esters prepared from allyl type alcohols and unsaturated polycarboxylic acids possess the desirable property of polymerizing under suitable conditions to give products of value. Under mild treatment, the thin, mobile monomeric esters can be polymerized or thickened to yield soluble viscous syrups or, under more drastic polymerizing conditions, can be set up to insoluble gels and then finally to hard, solid resins. The viscous soluble polymers possess the very desirable property of polymerizing or drying in thin layers to yield hard, flexible, light colored films and are, therefore, of definite value in the field of coating compositions. Generally, these polymerizations of the viscous syrup in films are carried out in the presence of catalytic proportions of metallic driers, for example, cobalt or manganese linoleate. While the syrups will dry in the air under suitable conditions, the rate of such drying is generally slow, and it is much more desirable to use the products in baking compositions. Good films may be obtained from certain of the esters on baking for only a few minutes at temperatures as low as 100° C.

The more detailed practice of the invention is illustrated by the following examples, wherein parts given are by weight unless otherwise stated. There are of course many forms of the invention other than these specific embodiments.

*Example I*

A mixture of 172 parts (1 mol) of ethyl maleate, 216 parts (3 mols) of methallyl alcohol, and 250 parts of dry benzene was heated at reflux under an efficient column equipped with a variable take-off. A small amount of para-phenylenediamine in absolute alcohol was added to the solution to serve as a polymerization inhibitor. To the boiling mixture was added slowly a 5% sodium ethylate catalyst solution, adjusting the rate of addition so as to maintain the interchange reaction at a uniform rate. Ethanol liberated by the reaction was eliminated by distillation, the temperature of the binary mixture at the top of the column being maintained at about 68° C. by suitably adjusting the rate of distillation. Fresh benzene was added to the reaction mixture from time to time to replace that distilled off. The reaction required six and one-half hours for completion, during which time 34 parts of catalyst solution was added. This catalyst solution was prepared by dissolving 5 parts of metallic sodium in 100 parts of absolute ethanol. The end of the reaction was indicated by the rise of the boiling temperature to 78–80° C. even when the system was operated at total reflux. At this point a theoretical quantity of alcohol had been removed from the reaction, as determined by shaking the benzene distillate with water. The reaction product was filtered, washed with acidified water until neutral (this process served to remove the p-phenylenediamine inhibitor), then dried with calcium chloride to remove most of the water. The benzene and excess methallyl alcohol was distilled off under a reflux column. On distillation of the residue under reduced pressure, the following fractions were obtained:

| Fraction | Boiling point | Parts |
|---|---|---|
| 1 | 143–148.5° C./7 mm | 68 |
| 2 | 148.5–157° C./7 mm | 37 |
| 3 | 157–163° C./7 mm | 27 |
| 4 | 163–165° C./7 mm | 70 |
|  | Residue | 19 |

All of these fractions were colorless, mobile liquids. Fraction 1 was fairly pure, dimethallyl maleate (I). Fraction 4 was a compound (II) derived by addition of methallyl alcohol to the ethylenic double bond of maleic acid. The composition of these esters are represented by the structures:

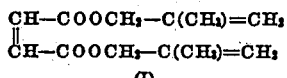

(I)

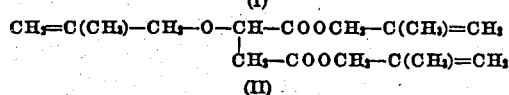

(II)

Fractions 2 and 3 were mixtures of these two compounds.

Fraction 1 polymerized on heating for a few minutes at 95° C. in the presence of 1% benzoyl peroxide. The product was a colorless, glass-clear, slightly brittle resin which was insoluble in the usual solvents. The polymerization took place with the evolution of considerable heat and with rapid increase in viscosity. The reaction took place more slowly at lower temperatures, or in the absence of oxygen yielding polymerization catalysts, and the products so obtained were generally of improved toughness.

Faction 4 did not polymerize in 24 hours at 95° C. in the presence of 1% benzoyl peroxide. In 72 hours at 95° the liquid polymerized to a soft, crumbly solid mass, which on longer heating became a hard, brittle product.

Fractions 2 and 3 polymerized at rates intermediate between Fractions 1 and 4.

A mixture of the four fractions in the ratios in which they were originally found was treated with 1% benzoyl peroxide and heated carefully at 90° C. In 35 minutes the mixture was showing very definite polymerization, the product being a fairly viscous soluble oil. On further heating at 90° C. the product set to an insoluble gel and finally formed a hard solid mass. The soluble oil was cut to a 50% solution in butyl acetate. Films flowed from this solution could be baked tack free in 20 minutes at 100° C. in the presence of cobalt drier (0.03% cobalt based on the ester). In the absence of the cobalt, ½ hour was required to attain the tack free state. These films were very hard and adherent to glass, steel, and other surfaces, but were somewhat brittle. They could be plasticized satisfactorily by adding a suitable material, for example, a bodied methallyl sebacate, prior to application. Results similar to the above were obtained using the individual ester fractions, though in certain cases (particularly with Fraction 1) extreme care was required to avoid gelation.

*Example II*

A mixture of 144 parts (1 mol) of dimethyl fumarate, 216 parts (3 mols) of methallyl alcohol, and 300 parts of benzene was heated together under the conditions described in Example I, using, however, sodium methylate catalyst in place of sodium ethylate and omitting the p-phenylenediamine inhibitor. The binary mixture of methanol and benzene distilled at 58–59° C. Six and one-half hours was required to complete the reaction. On working up as described in Example I, the following fractions were obtained:

| Fraction | Boiling point | Parts |
|---|---|---|
| 1 | 135–144° C./6–7 mm | 30 |
| 2 | 144–157° C./6–7 mm | 110 |
| 3 | 157–167° C./6–7 mm | 85 |
| Residue | | 13 |

The above yield of 238 parts should be compared with the theoretical yield of 224 parts of dimethallyl fumarate. The additional weight is to be attributed to addition of methallyl alcohol to the unsaturated double bond of the fumaric ester in a manner similar to that described in the case of methallyl maleate in Example I.

Fraction 1 is mainly dimethallyl fumarate (cf. Formula I, Example I), as indicated by the following analytical values:

| | C | H | I₂ No. |
|---|---|---|---|
| Calculated for $C_{12}H_{16}O_4$ | 64.2% | 7.1 | 226.8 |
| Found | 62.90% | 7.01 | 223.6 |

This fraction polymerized very quickly in the presence of a trace of benzoyl peroxide to give first a rubbery brittle polymer and then finally a hard, brittle insoluble mass. The polymerization was not readily susceptible of control of the soluble stage.

Fraction 3 did not polymerize on moderately long heating with benzoyl peroxide, though polymers would be obtained by heating for 72 hours at 100° C. This fraction consisted mainly of a compound corresponding to Formula II, Example I:

|  | Iodine No. |
|---|---|
| Calc. for $C_{16}H_{24}O_5$ | 257 |
| Found | 249.0 |

Fraction 2 was a mixture of the esters of Fractions 1 and 3. In the presence of 1% benzoyl peroxide this fraction polymerized more slowly than Fraction 1 at 100° C. to a thick viscous syrup, soluble in a butyl acetate-butyl alcohol mixture. Flow-outs from this solution baked tack free in one hour at 100° C., and in two hours gave a hard, adherent film which could not be scratched easily with the fingernail. Further polymerization of the syrup in bulk gave an insoluble mass.

A mixture of Fractions 1 and 3 in the ratio of 3:8.5 was treated with 0.5% benzoyl peroxide. On heating at 100° C. for 15 minutes a clear, soluble, viscous syrup was obtained. Flow-outs from a 50% solution of this syrup in butyl acetate set-up to a hard film on baking 1½ hours at 100° C. This film had very excellent hardness and good flexibility.

*Example III*

A mixture of 42 parts (0.17 mol) of the dimethyl ester of 1,4-dihydronaphthalene-2,3-dicarboxylic acid,

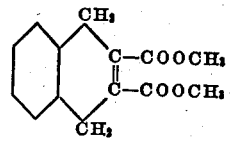

36 parts (0.5 mol) of methallyl alcohol, and 200 parts of benzene was treated as described in Example I using sodium methylate as catalyst. The reaction proceeded normally and on working up 19 parts of a liquid boiling at 219 to 226° C./7 mm. was obtained in addition to 12 parts of higher boiling residue. This liquid represented the desired dimethallyl ester, probably admixed with an addition product of this ester and methallyl alcohol analogous to the product illustrated by Formula II in Example I.

*Example IV*

A mixture of 70 parts (0.54 mol) of

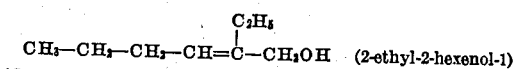

43 parts (0.25 mol) of diethyl fumarate, and 300 parts of dry benzene was combined as described in Example I, using sodium methylate as catalyst. The reaction required 6¾ hours. On working up in the usual fashion 45 parts of yellow oil boiling at 193–220° C./2 mm. was obtained.

The ester was polymerized by heating for three hours at 95–100° C. in the presence of 1% of benzoyl peroxide. Films prepared from the bodied ester dried on heating 16 hours at 100° C. The resulting films were tack-free but somewhat soft, being similar in appearance to films of linseed oil.

*Example V*

A mixture of 85 parts of crude $$CH_3CH_2CH=C(CH_3)-CH_2OH$$

(2-methyl-2-pentenol-1), 28.5 parts of diethyl fumarate, and 180 parts of benzene was reacted together as described in the previous example. On working up in the usual fashion, a product boiling at 140–210° C./2 mm. was separated (30 parts). Definite narrow fractions were not obtained during the distillation, and the mixture was considered to be of the same type as that obtained with methallyl maleate and methallyl fumarate in Examples I and II. The fumaric ester of 2-methyl-2-pentenol-1 so obtained polymerized in 3 hours at 100° C. in the presence of 0.03% cobalt to a dry film.

*Example VI*

Geraniol,

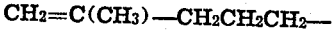 

(77 parts, 0.5 mol), and ethyl fumarate (34.4 parts, 0.2 mol) were condensed in benzene solution using a sodium methoxide catalyst, operating according to the method described in Example I. Six and one quarter hours were required to complete the reaction. The product was washed with water and dried under vacuum on a hot water bath to remove low boiling material, but no attempt was made to distill the ester itself due to its high boiling point. The product was a light red viscous liquid, having about the viscosity of linseed oil. Approximately eight hours' heating at 100° C. was required to polymerize this ester to a dry film, and on baking over night (16 hours) a hard tough film was obtained.

Example VII

An ester was prepared from diethyl fumarate and isopropenyl ethynyl carbinol by ester interchange as follows: A mixture of 48 parts (0.5 mol) of isopropenyl ethynyl carbinol,

$CH_2=C(CH_3)CHOH—C\equiv CH$

B. P. 142–3° C., and 34.4 parts (0.2 mol) of diethyl fumarate were condensed in benzene solution using sodium methylate as catalyst. On working up the product in the usual fashion, it was found to be impossible to distill the ester due to extensive decomposition. A sample of the crude product treated with 0.03% cobalt was found to dry in 1½ hours at 100° C.

Example VIII

Methallyl isopropenyl carbinol,

$CH_2=C(CH_3)CH_2CHOHC(CH_3)=CH_2$ (63 parts) and diethyl fumarate (34.4 parts) were condensed according to the conditions described previously. A main fraction boiling at 150–180° C./2–4 mm. was obtained. This was mainly the fumaric acid ester of methallyl isopropenyl carbinol. In the presence of cobalt drier, this product baked to a dry film in 1¼ hours at 100° C.

Example IX

Using the conditions and methods described in Example I, diethyl fumarate (68 parts, 0.4 mol) was condensed with 106.5 parts of 1-hydroxy-3-chlorobutene-2,

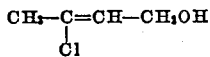
$CH_3—C=CH—CH_2OH$
$\quad\quad|$
$\quad\quad Cl$

On working up the reaction product, 129 parts of crude ester was obtained. This product did not polymerize in the presence of benzoyl peroxide on heating for three days at 100° C. On fractional distillation of this crude ester under vacuum, two main fractions boiling at 155–185°/2 mm., and 185–200°/2 mm., respectively, were obtained. These two fractions corresponded to the fumaric ester of 1-hydroxy-3-chlorobutene-2 and to the addition product formed by adding one mol of the alcohol to the double bond of this ester. Polymerization of the two fractions did not proceed to any marked extent even on long heating at 100° C. in the presence of either benzoyl peroxide or cobalt drier.

Example X

Allene carbinol, $CH_2=CH=CH—CH_2OH$, and diethyl fumarate (34 parts, 0.2 mol) were condensed using sodium methylate as catalyst. Six and one-half hours was required to complete the reaction. A total of 44 parts of crude ester was obtained. Flow-outs of this ester dried in on baking for one hour at 100° C. or for ten minutes at 140° C., in the presence of 0.3% cobalt. The film was amber in color and quite hard. On attempting to distill the crude allene carbinol fumarate under vacuum, extensive decomposition took place reaching almost to the point of explosive violence.

Example XI

Hexadiene-3,5-ol-2,

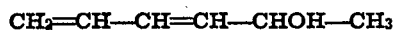
$CH_2=CH—CH=CH—CHOH—CH_3$ was condensed with ethyl fumarate using sodium methylate as catalyst. The desired ester was obtained as a viscous amber colored oil. No effort was made to distill the product due to the reactive nature of this ester. Flow-outs of this ester on glass plates dried in 25 minutes at 100° C. to yield hard, slightly yellow films. The ester air dried in 6 hours in the presence of metallic cobalt as drier.

Example XII

Ethyl itaconate (51.5 parts, 0.28 mol) and methallyl alcohol (60.3 parts, 0.84 mol) were condensed in the presence of sodium methoxide catalyst. On working up the reaction product as described in previous examples, the methallyl itaconate ester was obtained as two fractions boiling at 130–150° C. at 4 mm. and 150–172° C./4 mm. The lower boiling fraction, which was mainly dimethallyl itaconate, polymerized to a soft resin on heating for 3½ hours at 100° C. in the presence of 1% benzoyl peroxide. This fraction (unbodied) in the presence of cobalt drier dried to soft films on heating 1½ hours at 100° C. The second fraction, probably containing a large proportion of the addition product of methallyl alcohol to the methallyl itaconate, polymerized much more slowly.

An attempt to prepare methallyl itaconate by the direct esterification of itaconic acid with methallyl alcohol was not successful. Benzene was used as the carrier to remove the water of reaction as well as to serve as the means of controlling the heating to prevent charring. In spite of all precautions, extensive darkening took place, and there was evidence of decomposition. The final product was a black viscous mass which could not be distilled due to extensive decomposition. It was apparent that this method did not serve for the satisfactory formation of the ester. In another experiment, sulfonic acid was used as a catalyst but considerable darkening occurred as before, and there was evidence of decomposition.

Example XIII

Ethyl fumarate (172 parts, 1 mol) and tiglyl alcohol, $CH_3—CH=C(CH_3)—CH_2OH$, (258 parts, 3 mols), were condensed in the presence of sodium methoxide catalyst according to the method described previously. On distillation of the purified reaction products, the following fractions were obtained:

| Fraction | Boiling point | Parts |
|---|---|---|
| 1 | 155/7 mm. to 169/5 mm. | 67 |
| 2 | 169–180/5 mm. | 110 |
| 3 | 170–185/3 mm. | 27 |
| 4 | 185–200/3–4 mm. | 48 |
| 5 | Residue | 20 |

All of the fractions were colorless except the residue. The lower boiling portions contained mainly the tiglyl alcohol ester of fumaric acid while the higher fractions were made up largely of the addition products of tiglyl alcohol to this ester.

In the presence of 1% benzoyl peroxide, Fractions 1 and 2 polymerized to viscous oils in one week at 100° C. During the same heating period Fractions 3 and 4 were scarcely affected. In the presence of 0.03% cobalt, all of the fractions polymerized to tacky films on baking for 2-4 hours at 100° C. The residual tackiness of these films was not lost on longer baking.

In the process of the present invention any unsaturated polycarboxylic acid may be used. The unsaturated polycarboxylic acids employed in this invention may be either aliphatic, hydroaromatic, heterocyclic, or aromatic in nature. They contain at least one unsaturated ethylenic linkage which may or may not be in a position conjugate to the carbonyl group of the acid. Examples of acids covered in this invention are maleic acid, fumaric acid, itaconic acid, vinylmalonic acid, citraconic acid, aconitic acid, tetrahydrophthalic acid, 1,2-dihydronaphthalene-2,3-dicarboxylic acid, 1,4-dihydronaphthalene-2,3-dicarboxylic acid, and the like, although the invention is not limited to these. It is to be understood that the word "unsaturated" is used in the meaning well known to chemists of a material exhibiting the unsaturation characteristic of an aliphatic double bond.

As explained elsewhere in the specification, these acids are used in the form of their esters with lower alcohols, especially ethanol and methanol, although other suitable lower alcohols, e. g., butanol, pentanol, etc., may be used where the boiling point relationships with the allyl type alcohol employed in the interchange are satisfactory to permit easy elimination of the lower alcohol set free in the reaction, i. e., the alcohol of the ester should be more volatile, i. e., have a lower boiling point, than the allyl type alcohol. In practice, however, it is satisfactory and most suitable, as well as generally cheapest, to use the ethyl and methyl esters. Particularly when benzene is used as the solvent or carrier, these two alcohols are especially desirable since they form binary mixtures of much lower boiling point than the alcohols themselves and thus can readily be removed from the reaction mixture.

In the process of the present invention any primary or secondary allyl type alcohol may be used. By "allyl type alcohol" is meant an alcohol in which the carbinol group is attached to an unsaturated carbon atom, i. e., the alcohols which may be used have attached to the carbinol (COH) group at least one hydrogen atom and at least one carbon which carries an ethylenic double bond. The alcohols may be entirely aliphatic in nature, or may contain a cyclic (aromatic, hydroaromatic, or heterocyclic) group. The carbinol group may be primary or secondary but not tertiary. The preferred compounds are entirely aliphatic in nature. Any purely aliphatic allyl type primary or secondary alcohol may be used. In addition to the allyl type of unsaturation, the alcohols may contain other unsaturated linkages, as typified in the examples below.

Specific examples of alcohols which fall under the scope of this invention include, among many others:

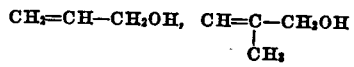

(allyl alcohol)    (methallyl alcohol),

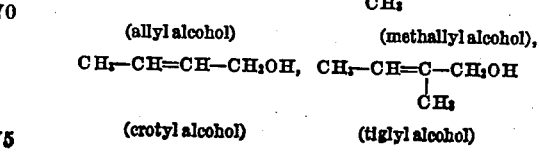

(crotyl alcohol)    (tiglyl alcohol)

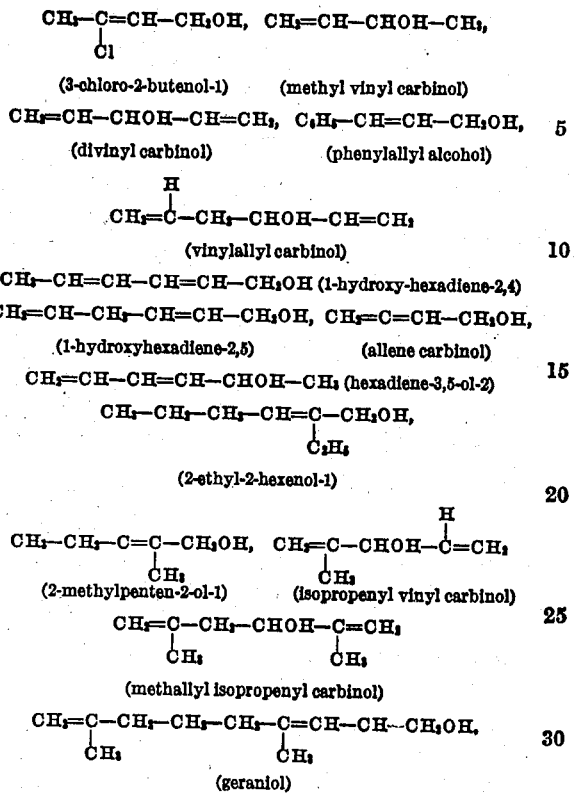

and the like, along with their homologues, analogues, and suitable substitution products.

In addition to the sodium methylate and sodium ethylate solution described in the examples, other alkali alkoxide solutions may be employed. One advantage of the sodium alkoxides prepared from the lower alcohols is that the excess alcohol used in preparing the catalyst solution is readily removed from the reaction mixture in the same fashion as is the alcohol formed by the interchange. Catalysts may also be prepared by dissolving an alkali metal in the allyl type alcohol used in the reaction. It is also possible to use concentrated solutions of alkali hydroxides in lower alcohols in place of the alkali metal alkoxide. Furthermore, I may use alkali hydroxide either in the solid form, although when this is done it is sometimes difficult to obtain satisfactory solution of the hydroxide in the reacting mixture, or along with the inert diluent as a slurry therein. Alkali metals in the solid form may also be added directly to the mixture to serve as catalyst. Litharge or calcium oxide may also be used as a catalyst for this reaction, though these are generally less satisfactory. In some cases, alkali carbonates work satisfactorily. It is probably sufficient that the reacting mixture be maintained merely on the alkaline side to obtain reaction.

As solvent for the interchange reaction, I have illustrated in the examples the use of benzene. This hydrocarbon is very satisfactory for the purpose since it succeeds both in maintaining a low reaction temperature and in serving as a medium for removing alcohol of reaction through distillation as a binary mixture. Toluene may be employed in an equivalent manner although generally the reaction temperature in the flask will be somewhat higher when this solvent is employed. Any inert organic liquid which is relatively low boiling (to facilitate separation from the higher boiling ester) and which is a solvent for the various components of the reaction is satisfactory. Thus chlorinated aliphatic hydrocarbons such as ethylene dichloride and carbon tetrachloride may be used. Reactive solvents such as methyl acetate or acetone are not satisfactory for this reaction. The amount of the solvent used in the reaction mixture may be varied from very small amounts to quite large quantities. In general, it may be said that the use of smaller amounts of solvents favors more rapid reaction. It is possible to operate in the absence of an added inert solvent, although this practice requires more careful temperature control and, at the same time, makes it much more difficult to remove the alcohol of reaction as it is formed. It is therefore not a preferred modification.

In forming these esters of unsaturated polycarboxylic acids, it is desirable to employ an excess of the allyl type alcohol. This excess need not be great, but should be sufficient to insure complete reaction. In general, the excess should be in the neighborhood of at least 10%. The use of larger proportions of the allyl type alcohol is not undesirable, since it is possible to recover the excess from the final reaction product. As pointed out previously, the formation of the addition product of the allyl alcohol with the allyl ester can be controlled to some extent by the amount of excess allyl alcohol used throughout the reaction.

Polymerizations of these new allyl type esters may be carried out in any desired manner. Oxygen yielding catalysts, for example, benzoyl peroxide, are particularly suitable for use in promoting the reaction, although it is possible to operate in the absence of a catalyst. The polymerizations are generally sluggish at low temperatures and require heating in the neighborhood of 50–100° C. to produce resinification at a reasonable rate. Polymerization at much higher temperatures, for example, 150° C. or even 200° C., is quite feasible and in some cases desirable. These high temperatures have been found to produce very little if any discoloration of the esters. The rate of polymerization depends upon the composition of the ester used. In general, it is not possible to predict beforehand the relative rate of polymerization of a compound of this class. As illustrated in the examples, the methallyl esters corresponding to Formula I (described previously) generally polymerize more readily than do the esters formed by adding alcohol to the double bond of the acid (cf. Formula II). The esters of unsaturated acids described herein in general polymerize much more readily than do the esters of saturated polycarboxylic acids and, in the absence of a polymerization inhibitor, may over a period ranging from several weeks to several months polymerize to solid masses even at room temperature. The most unusual property of these esters is the fact that, although they polymerize finally to a gelled insoluble, infusible state, the polymerization may be stopped at an intermediate soluble form which is capable of being converted further to the final highly polymerized form. The reaction may be conveniently stopped at an intermediate point by merely cooling at a lower temperature. The soluble forms are more or less viscous and resemble the bodied natural drying oils. On further heating polymerization to solid products occurs. Of especial interest from the point of view of the coating composition industry is the fact that thin layers prepared from the bodied esters or from solutions thereof set up on baking to dry films. Metallic driers such as cobalt or manganese linoleate accelerate the hardening of these films, this action being apparently analogous to their function in promoting the drying of natural oils. Baking at elevated temperatures, preferably at least 60–75° C., is to be preferred, and good results are also obtained at much higher temperatures, for example, at 125° C. or 150° C. These products may thus be used alone as a varnish or may be admixed with pigments or plasticizers, etc.

The esters of this invention are a new class of materials which are valuable in the unpolymerized form as solvents and plasticizers. Because of their very high boiling points and low volatility as well as because of their chemical make-up, these esters are desirable for use as plasticizers in various types of plastic and coating compositions. They are particularly useful in combinations with cellulose acetate, cellulose nitrate, ethyl cellulose and other cellulose esters and/or ethers. These esters, particularly in the partially polymerized or bodied form described in the examples, are useful in various types of coating compositions. Both with and without added cobalt or other driers, these esters can be set up to yield hard, light-colored, tough and flexible films having good resistance to water. While it is possible to obtain good films from these bodied esters in an unmodified condition, it is sometimes desirable to add other agents as modifying agents. The use of the bodied esters in coating compositions is to be preferred over the use of the unbodied materials, since the viscosity and surface tension characteristics of the bodied resins are much more suitable for use in the production of films. By controlling the bodying action, it is possible to obtain products which are of the right consistency and viscosity for use for application at 100% solids or with only slight dilution with organic solvent. This is a definite advantage as it is recognized to be highly desirable to employ a varnish vehicle of this type at as high solids as is possible. Satisfactory enamels may be prepared by incorporating pigments with the esters particularly in the bodied form. In preference to using the pure bodied ester itself, it may sometimes be desirable to body mixtures of two or more of these esters or one of these esters and another similar unsaturated material. These esters are also suitable for use in interpolymerizing with other polymerizable compounds such as vinyl esters, acrylic or methacrylic esters, butadiene, styrene, etc., to form products useful in either coating or molding applications.

The above description and examples are intended to be illustrative only. Any modification of or variation therefrom which conforms to the spirit of the invention is intended to be included within the scope of the claim.

I claim:

Process of obtaining a resinous polymer which comprises heating a composition having dimethallyl maleate as its sole polymerizable component at 95° C. with 1% of its weight of benzoyl peroxide.

HENRY S. ROTHROCK.